US008162570B2

(12) United States Patent
Mauchle et al.

(10) Patent No.: US 8,162,570 B2
(45) Date of Patent: Apr. 24, 2012

(54) POWDER FEEDING DEVICE FOR SPRAY COATING POWDER

(75) Inventors: Feix Mauchle, Abtwil (CH); Marco Sanwald, Abtwil (CH)

(73) Assignee: ITW Gema GmbH, St. Gallen (CH)

( * ) Notice: Subject to any disclaimer, the term of this patent is extended or adjusted under 35 U.S.C. 154(b) by 478 days.

(21) Appl. No.: 12/027,403

(22) Filed: Feb. 7, 2008

(65) Prior Publication Data

US 2008/0190359 A1 Aug. 14, 2008

(30) Foreign Application Priority Data

Feb. 13, 2007 (DE) ......................... 10 2007 007 588

(51) Int. Cl.
*B65G 51/34* (2006.01)

(52) U.S. Cl. ......................................... 406/13; 406/181

(58) Field of Classification Search .................. 406/109, 406/112, 181–183, 12, 13, 155, 1–3
See application file for complete search history.

(56) References Cited

U.S. PATENT DOCUMENTS

| | | | | |
|---|---|---|---|---|
| 3,489,178 | A * | 1/1970 | Kice | 406/183 |
| 3,918,641 | A | 11/1975 | Lehmann et al. | |
| 4,834,589 | A * | 5/1989 | Dietrich | 406/109 |
| 5,622,457 | A * | 4/1997 | Thiele | 406/1 |
| 5,645,380 | A * | 7/1997 | Rutz | 406/153 |
| 5,743,251 | A | 4/1998 | Howell et al. | |
| 6,398,462 | B1 * | 6/2002 | Fulkerson | 406/134 |
| 6,508,610 | B2 | 1/2003 | Dietrich | |
| 7,144,213 | B2 * | 12/2006 | Cartwright | 414/217 |
| 7,150,585 | B2 * | 12/2006 | Kleineidam et al. | 406/50 |
| 7,287,964 | B2 * | 10/2007 | Sanwald | 417/397 |
| 7,410,329 | B2 * | 8/2008 | Simontacchi | 406/98 |
| 7,452,166 | B2 * | 11/2008 | von Keudell et al. | 406/98 |
| 7,465,130 | B2 * | 12/2008 | Herre et al. | 406/50 |
| 7,478,976 | B2 * | 1/2009 | Kleineidam et al. | 406/50 |
| 7,481,605 | B2 * | 1/2009 | Kleineidam et al. | 406/50 |
| 7,530,768 | B2 * | 5/2009 | Durr et al. | 406/151 |
| 2002/0129765 | A1 | 9/2002 | Mauchle | |
| 2005/0158187 | A1 * | 7/2005 | Fulkerson et al. | 417/390 |
| 2006/0162794 | A1 * | 7/2006 | Mueller et al. | 137/625.47 |
| 2006/0177280 | A1 * | 8/2006 | Von Keudell et al. | 406/134 |
| 2006/0193704 | A1 | 8/2006 | Simontacchi | |

FOREIGN PATENT DOCUMENTS

| | | | |
|---|---|---|---|
| DE | 4239496 | A1 | 5/1994 |
| DE | 10145448 | A1 | 5/2003 |
| DE | 10353968 | A1 | 7/2005 |
| EP | 0412289 | A2 | 2/1991 |
| EP | 1240947 | A1 | 9/2002 |
| JP | 09-071325 | A | 3/1997 |
| WO | 97/42993 | A2 | 11/1997 |

OTHER PUBLICATIONS

ISR and Written Opinion for PCT/IB2008/000301 dated Jun. 3, 2008.

* cited by examiner

*Primary Examiner* — Gene Crawford
*Assistant Examiner* — William R Harp
(74) *Attorney, Agent, or Firm* — Lowe Haupteman Ham & Berner LLP

(57) ABSTRACT

A spraycoating powder feed apparatus includes a powder pump of which the direction of feed is reversible and a conduit switch configured to alternately link either of two powder conduits to a powder hookup of the powder pump as a function of the conveyance direction of the powder pump.

21 Claims, 4 Drawing Sheets

POWDER FEEDING DEVICE FOR SPRAY COATING POWDER

RELATED APPLICATIONS

The present application is based on, and claims priority from German Application Number 10 2007 007588.1 filed Feb. 13, 2007, the disclosure of which is hereby incorporated by reference herein in its entirety.

BACKGROUND

The present invention relates to a powder feeding device for spray coating powder, hereafter spraycoating powder feed apparatus.

The patent documents DE 103 53 968 A1; U.S. Pat. No. 6,508,610 B2; US 2006/0193704 A1 and JP 09071325 A disclose coating powder feeding pumps which by means of a partial vacuum aspirate a powder dose into a powder chamber and then expel said dose from said chamber by means of compressed air. In said documents the (partial) vacuum is produced by a vacuum source and the compressed air by a compressed air source. The German patent document DE 101 45 448 A1 discloses a powder pump fitted with a powder chamber wherein the vacuum is produced by a suction plunger bounding the powder chamber. The European patent document EP 0 412 289 B1 discloses a powder pump in the form of an injector.

Electrostatic powder spraycoating equipment is known from EP 0 412 289 B1. Other powder spraycoating equipment is known from DE 42 39 496 A1 and U.S. Pat. No. 3,918,641.

SUMMARY

The objective of the disclosed embodiments is to use coating powder more efficiently.

The disclosed embodiments relate to a spraycoating powder feed apparatus that includes a powder pump, of which the feed direction is reversible, and which pneumatically moves powder from a first powder hookup to a second powder hookup or pneumatically moves powder from the second powder hookup to the first. Disclosed embodiments further include a conduit switch fitted with at least three conduit connections to alternately connect a first of the conduit connections to the second or third one wherein the first conduit connection of the conduit switch is connected to the second powder hookup of the powder pump.

Another embodiment is characterized in that the powder pump comprises at least one powder chamber between its two powder hookups, said chamber being fitted with two powder apertures each comprising one valve and each being loaded alternatingly with a partial vacuum or compressed air, in that a dose of coating powder can be aspirated by said vacuum through one of the two powder apertures into the powder chamber and thereupon the dose of coating powder can be expelled from the powder chamber by compressed air through the pertinent other powder aperture.

BRIEF DESCRIPTION OF THE DRAWINGS

Embodiments are described below.

FIGS. 1, 2, 3, 4, 5 show various alternatingly configured operational stages of the powder feed apparatus while using a single chamber powder pump alternatingly moving spraycoating powder by vacuum or compressed air.

DETAILED DESCRIPTION OF THE DRAWINGS

Figure 1:
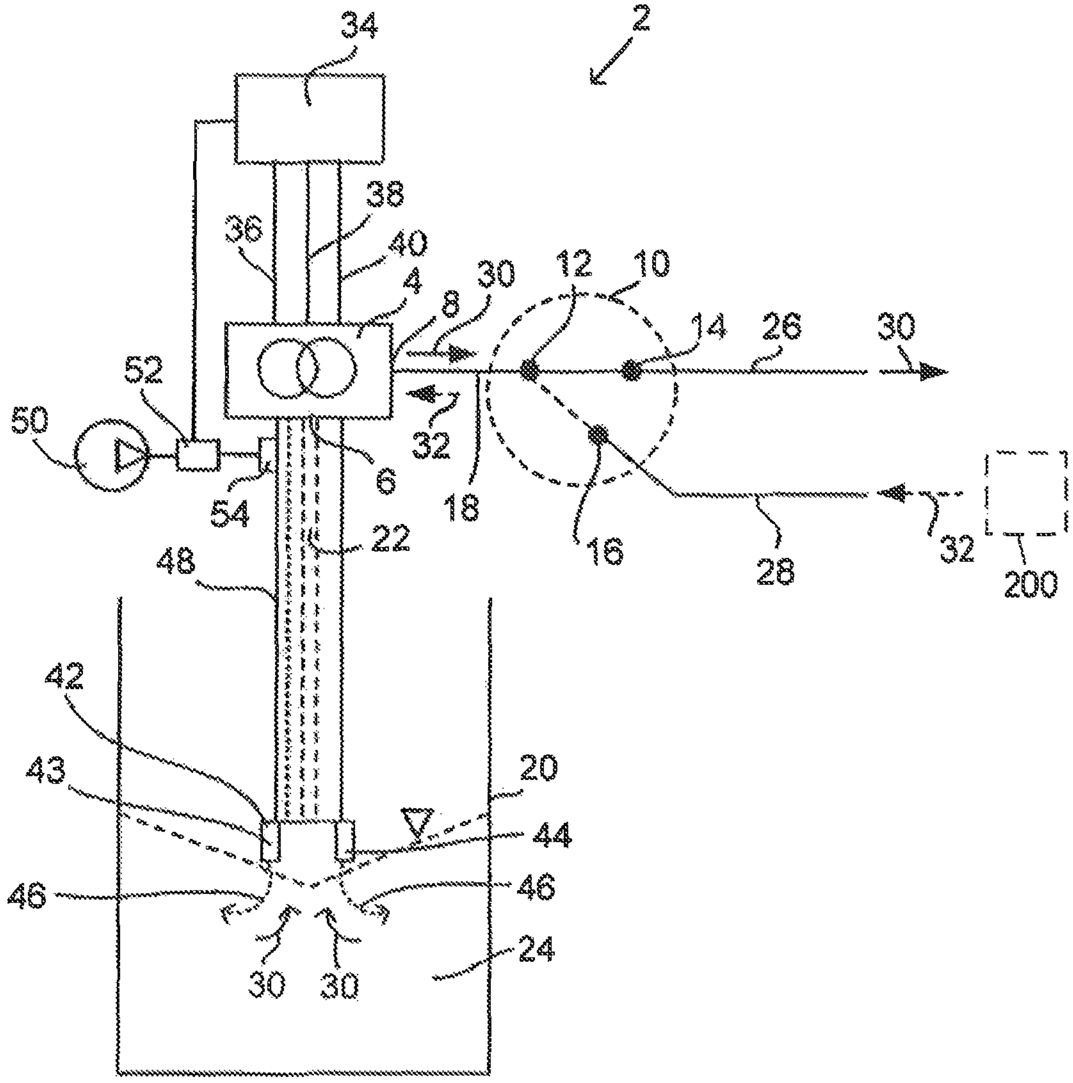
FIG. 1 shows a spraycoating powder feed apparatus according to one embodiment.

At least one powder feed apparatus 2 for spraycoating powder, as shown in FIG. 1 contains a powder pump 4 of which the feed/conveying direction is reversible to move powder from a first powder hookup 6 to a second powder hookup 8 or to move powder from the second powder hookup 8 to the first powder hookup 6.

The powder feed apparatus 2 furthermore contains a conduit switch 10 fitted with at least three conduit connections 12, 14, and 16 to link a first conduit connection 12 alternatingly to a second conduit connection 14 or to the third conduit connection 16. The first conduit connection 12 of the conduit switch 10 is linked to the second powder connection 8 of the powder pump 4, either directly or by a conduit stub 18.

The first powder hookup 6 of the powder pump 4 may be mounted on a wall aperture of a powder container 20 or on a powder conduit 22, for instance a hose or preferably a powder tube/pipe that can dip into a powder container 20. In at least one embodiment, the powder conduit 22 is a powder feed pipe.

Depending on the particular feed direction of the powder pump 4, coating powder 24 may be removed from or into the powder container 20. Powder conduits 26 and 28, respectively, may be connected to the two conduit connections 14 and 16 of the conduit switch 10. One powder conduit, illustratively the powder conduit 26, may be a powder delivery conduit to deliver coating powder from the powder container 20 to another powder container or to a powder sprayer. The other powder conduit, for instance the powder conduit 28, may be a powder recovery conduit to return sprayed coating powder that missed an object to be coated.

The above design allows versatile applications of the powder feed apparatus 2. In one application, the powder container 20 contains fresh spraycoating powder 24 which is removed by the powder pump 4 from the container 20 and moved through the conduit switch 10 to and through the powder delivery conduit 26 as indicated by the solid-line arrows 30 in FIG. 1. In this case the powder pump is switched to forward conveyance and the conduit switch 10 links together its two conduit connections 12 and 14.

In another application, the direction of conveyance of the powder pump 4 is reversed and the conduit switch 10 is set in a manner that its two conduit connections 12 and 16 are linked to each other, but not its two conduit connections 12 and 14. In this configuration recovery powder can be moved through the recovery conduit 28 from a recovered powder tank 200, further through the conduit connections 16 and 12 of the conduit switch 10 and the powder pump 4, into the powder container 20 when this container no longer holds fresh spraycoating powder 24. If on the other hand the powder container 20 does contain fresh spraycoating powder 24, the powder conveying tube 22 may be removed from it and be dipped into another, omitted powder container in order to move recovery powder into this other container. The recovery powder is schematically indicated in FIG. 1 by dashed arrows 32 which also show the back direction of conveyance.

The powder pump 4 is driven by a control unit 34. Illustratively control unit 34 is connected by means of three control conduits 36, 38 and 40 to the powder pump 4.

The same control unit 34, or another, also may be designed to drive the conduit switch 10. There are a number of ways to reverse the conveyance direction of the powder pump 4 and to drive the conduit switch 10. One way is to switch the powder pump 4 and the switch 10 independently of one another, either by manual or automatic control. However in at least one embodiment, the powder pump 4 and the conduit switch 10 are driven into reversal jointly by the control unit 34, the switched positions of the powder pump 4 and of the conduit switch 10 being interdependent in a manner that in the case of forward feed (solid line powder arrows 30) by the powder pump 4, the first conduit connection 12 of the conduit switch 10 is linked to the second conduit connection 14, whereas in the opposite case, namely reverse feed (dashed powder arrows 32) of the powder pump 4, the first conduit connection 12 of the conduit switch 10 is linked to the third conduit connection 16.

The control unit 34 preferably is designed to automatically drive the powder pump 4 and the conduit switch 10 as a function of at least one control signal.

In another embodiment, the powder pump 4 is affixed to the upper end of the powder feed tube 22 and jointly with it forms one component. In another embodiment mode, said pump and tube also might connected to each other by linking conduits.

The powder feed device preferably also contains a fluidizing element 42 which jointly with the powder feed tube 22 constitutes one unit, said fluidizing element being fitted at the lower end of the powder feed tube 22 with a fluidizing air delivery element 43 respectively 44 which is porous to compressed air but impermeable to coating powder. As a result compressed air used as the fluidizing air 46 is able to flow from the delivery elements 44 into the coating powder 24 in order to loosen it and in this manner to transform it into a fluid (fluidized) state appropriate for the pneumatic feed through the powder pump 4.

The fluidizing air 44 may be fed for instance through an air tube 48 to the dispensing elements 43. Said air tube may be configured next to the powder feed tube 22 or it may coaxially enclose it and constitute one unit jointly with said powder feed tube. Compressed air from a compressed air source 50 and serving as fluidizing air may be fed through a pressure regulator, further through a valve 52 and a fluidizing air connection 54 at the upper tube end to the air tube 48. The valve 52 may illustratively be driven by the control unit 34.

The powder pump 4 may be arbitrary. Preferably however, it shall comprise at least one powder chamber into which a dose of coating powder can be aspirated by a vacuum through one of the two powder hookups 6 respectively 8 and then the dose of coating powder can be expelled by the particular other powder hookup 8 and 6.

The principle of operation of such a pump is described hereafter by means of a powder pump 104 in FIGS. 2, 3, 4 and 5, said pump 104 comprising only one powder chamber. However, in at least some modes, powder pumps are used that contain two or more powder chambers that move coating powder in time-overlapping manner. Components shown in FIGS. 2 through 5 that correspond to components shown in FIG. 1 are denoted by the same reference symbols. The powder feed apparatus as a whole is denoted by 102.

The control unit 34 is linked, for instance, by a compressed air conduit 58 and a valve 60 to the compressed air source 50, and by means of a vacuum conduit 62 and a valve 64, to a source of vacuum 66. The control conduits 36, 38 and 40 are air conduits. The control conduit 38 is linked by the control unit 34 alternatingly with the compressed air source 50 or the vacuum source 66. The two other control conduits 36 and 40 can be linked by the control unit 34 alternatingly to the compressed air source 50 or are vented to open and close a valve 68 at a powder aperture 70 at one end of a powder chamber 72 and to open and close a further valve 74 at a powder aperture 76 at an opposite end of the powder chamber 72. Instead of using driven valves, other valves also may be used that automatically open or close as a function of the excess pressure or vacuum at the powder apertures 70 and 76. One valve, for instance 68, shall always be open when the other valve, for instance 74, shall be closed, and vice versa. One powder aperture, namely 70, is associated with one powder hookup, namely 6. The other powder aperture 76 is associated with the other powder hookup 8.

The compressed air from the compressed air source 50 and the vacuum from the vacuum source 66 alternatingly pass through the control conduit 38 and through a membrane or other filtering element 80 into the powder chamber 72. The filtering element 80 is permeable to compressed air and vacuum, but impermeable to powder particles. Instead of alternatingly passing compressed air and vacuum through the same control conduit 38, two separate conduits 38 also may be used.

Figure 2:
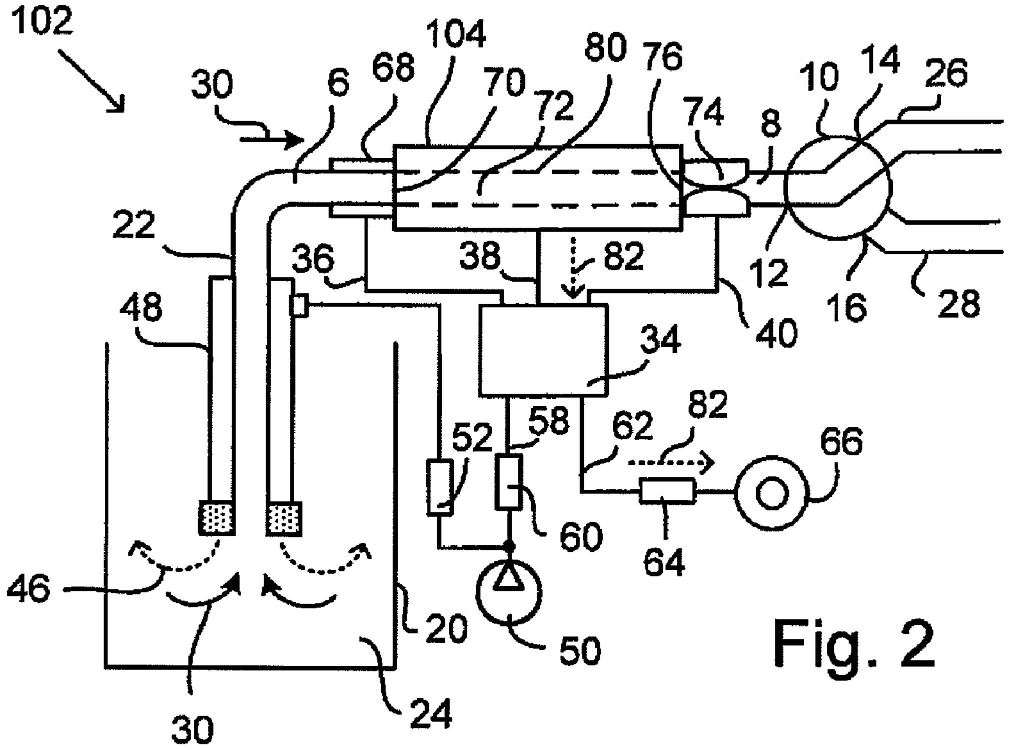
Figure 3:
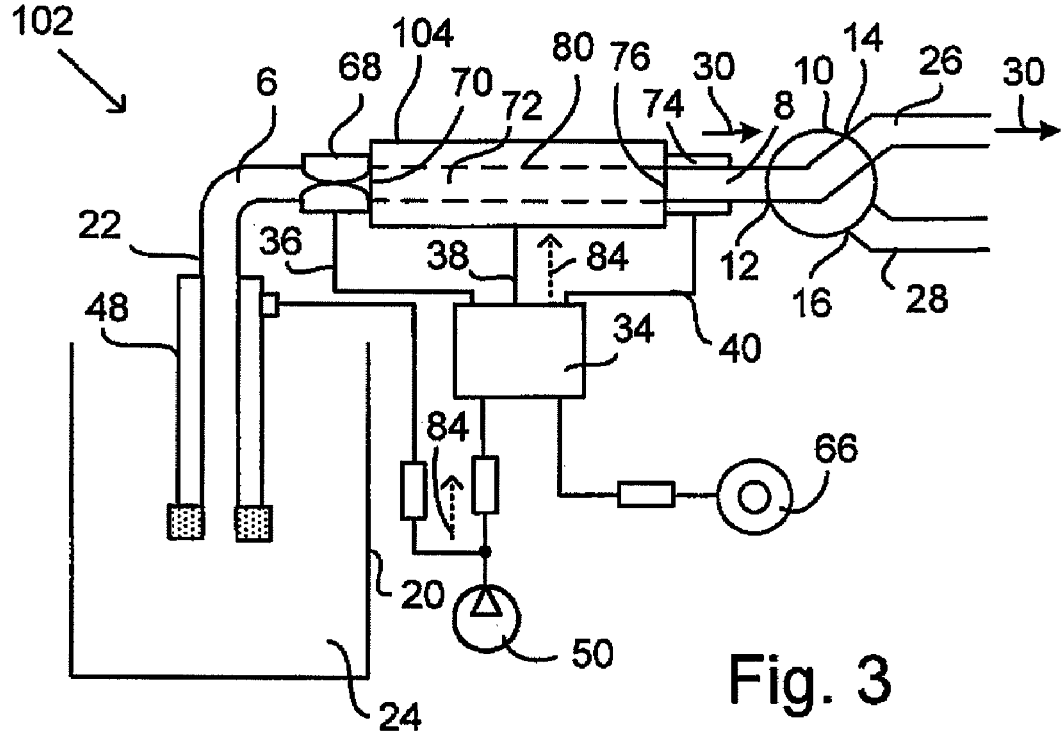

FIGS. 2 and 3 show the powder feed apparatus 102 and the powder pump 104 when powder is dispensed from the powder container into the forward feed direction 30, the conduit connections 12 and 14 of the conduit switch 10 being linked to each other.

In the first operational stage shown in FIG. 2, coating powder 24 is aspirated out of the powder container 20 through the open valve 68 of the powder aperture 70 at a powder hookup 6 by means of the vacuum 82 (partial vacuum flow) of the vacuum source 66 into the powder chamber 72, while the valve 74 of the other powder hookup 8 is closed, as a result of which a given dose of coating powder is stored in the powder chamber 72. Arrows 82 indicate the direction in which the vacuum is effective.

In the second operational stage shown in FIG. 3, the dose of coating powder stored in the powder chamber 72 is moved by compressed air 84 from the compressed air source 50 through the opened valve 74 of the other powder aperture 76 of the other powder hookup 8 to the conduit switch 10 and from latter into the powder dispensing conduit 26, while the valve 68 of the other powder hookup 6 is closed.

The two operational stages of FIGS. 2 and 3 may be repeated alternatingly as often as desired.

Figure 4:
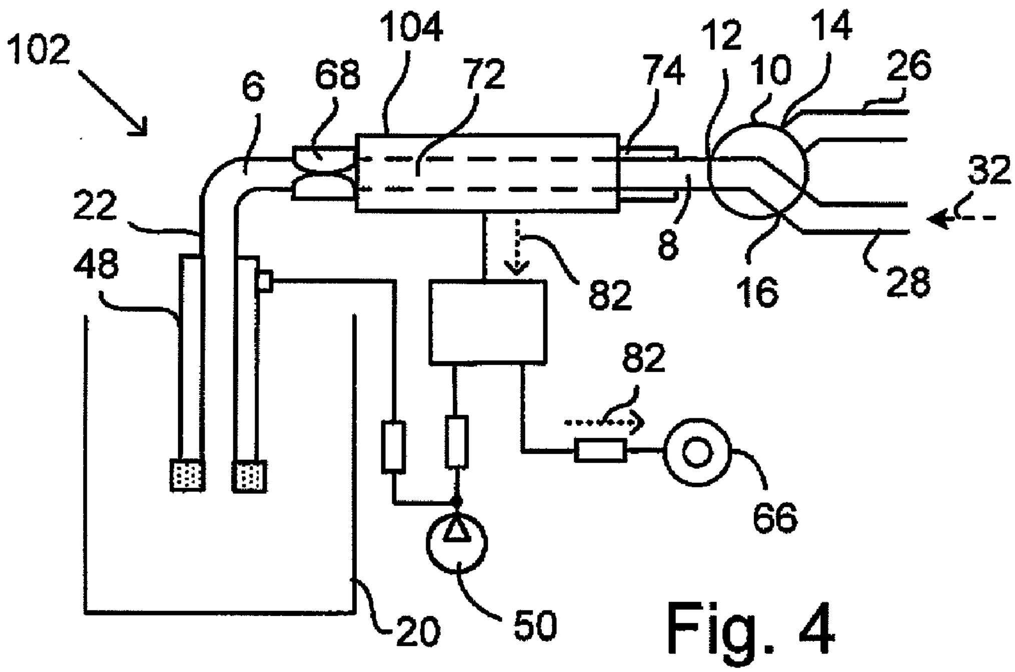
Figure 5:
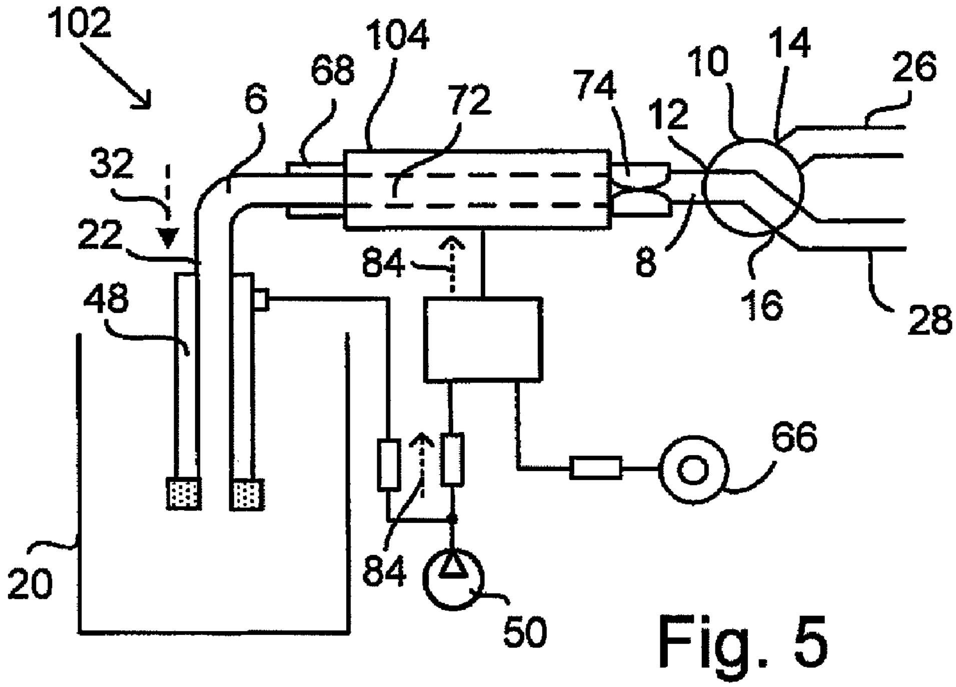

FIGS. 4 and 5 show the powder recovery operational state wherein the direction of powder feed of the power pump 4 is switched into the reverse feed direction 32 wherein the conduit connections 12 and 16 of the conduit switch are linked to each other.

In that respect FIG. 4 shows a first operational stage wherein recovery powder 32 from the powder recovery conduit 28 is aspirated through the conduit switch 10 and the open valve 24 of the other powder hookup 8 into the powder chamber 72 by means of a vacuum 82 from the vacuum source 66 while the valve 68 of the other powder hookup 6 is closed.

As regards the second operational stage of powder recovery shown in FIG. 5, the dose of recover powder 32 stored in the powder chamber 72 is expelled by compressed air 84 from the compressed air source 50 through the open valve 68 of the powder hookup 6 while the valve 74 of the other powder hookup 8 is closed.

The two operational stages shown in FIGS. 4 and 5 may be repeated alternated as often as desired.

Figure 6:
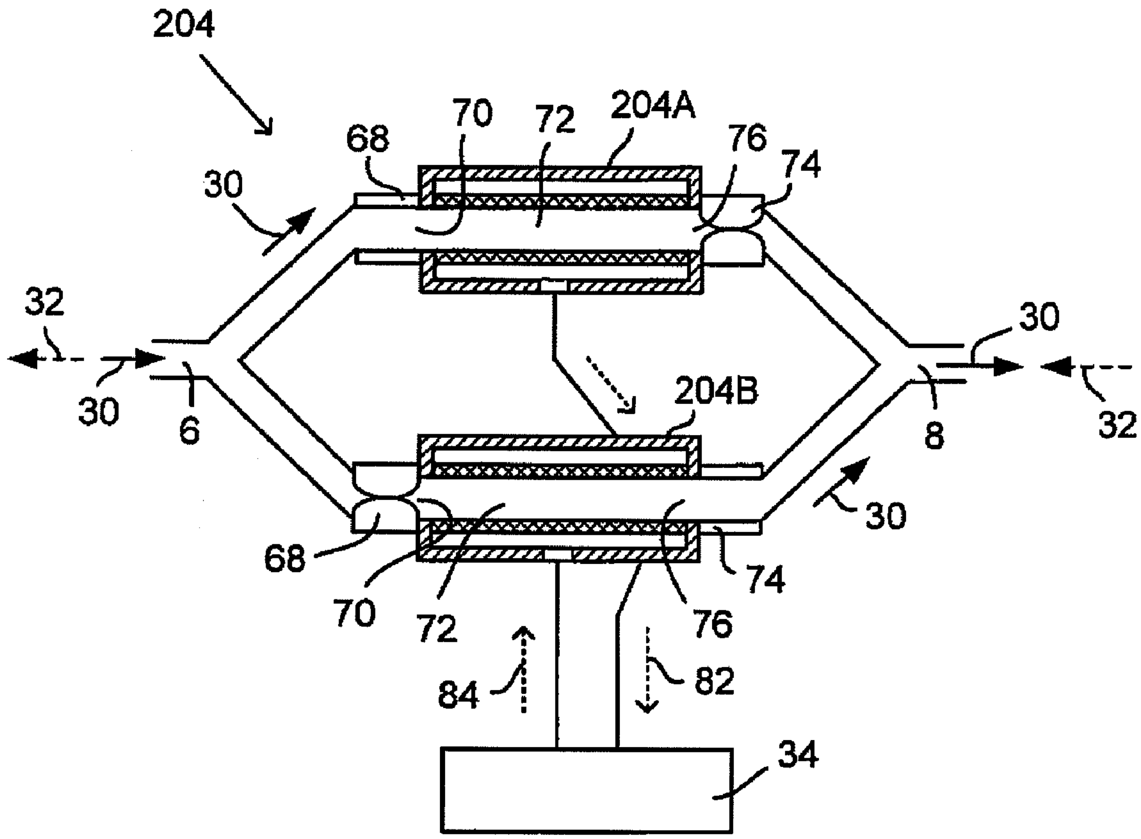
FIG. 6 shows a powder pump comprising two powder chambers moving powder by alternatingly applied vacuum and compressed air.

FIG. 6 shows a powder pump 204 which may be used in lieu of the powder pump 104 of FIGS. 2 through 5 or in lieu of the powder pump 4 of FIG. 1. The powder pump 204 contains two pumps 204A and 204B which jointly constitute this powder pump 204 and which may either be connected to each other by conduits or preferably jointly constitute one pump unit. As described above in relation to FIGS. 2 through 5, each of the two pumps 204A and 204B contains a powder chamber 72 with powder apertures 70 and 76 at mutually oppositely directed chamber ends, each being opened and closed by a valve 68 respectively 74. The chamber apertures 70 of the two pumps 204A and 204B may be connected in each case alternatingly by means of their valves 68 with the powder hookup 6 or be separated from it. In this process, one of the two valves will be open when the other is closed, and vice versa. The two other chamber apertures 76 may be connected by their valves 74 alternating with the other powder hookup 8. In this instance when one of the two valves 74 is open, the other is closed, and vice-versa.

In the operational state of the powder feed being in the forward direction 30, spraycoating powder 24 is aspirated in a first operational stage at a powder hookup 6 by means of the vacuum 82 into the power chamber 72 of the pump 204A, while at the same time a stored dose of spraycoating powder is expelled from the powder chamber 72 of the other pump 204B by means of compressed air 84 at the other powder hookup 8. The valve 68 shown on the left is opened during this first operational stage at the pump 204A shown at the top of FIG. 6 and the valve 74 shown at the right is closed, while, as regards the pump 204B shown at the bottom, the left valve 68 is closed and the right valve 74 is open. During the second operational stage during the operational state of powder conveyance in the forward powder feed direction 30 of FIG. 6, the valve 68 shown at the top pump 204A is closed and the valve 74 on the right is open to allow expelling the stored dose of spraycoating powder by means of compressed air 82, while at the same time the valve 68 shown at the lower pump 204B is open and the valve 74 at the right is closed in order to aspirate spraycoating powder by means of the vacuum 82.

After the operational state of the powder pump 204 has been switched to powder recovery in the reverse powder conveyance direction 32, the valves 68 and 74 are alternatingly opened and closed in the same manner. There is a difference relative to the operational state of powder delivery in the forward powder feed direction 30 in that, during powder recovery in the reverse powder conveyance direction 32 during the first operational stage, compressed air 84 is applied instead of vacuum 82 at the upper pump 204A while simultaneously a vacuum 82 is applied instead of compressed air 84 at the lower pump 204B, and then during the second operational stage, vacuum 82 is applied to the upper pump 204A and compressed air 84 to the lower pump.

Moreover such powder pumps are also applicable in embodiments that employ valves other than the valves 68 and 74, namely which automatically open respectively close due to the excess compressed-air pressures 84 and partial vacua 82 prevailing at the powder apertures 70 and 76.

The conduit switch 10 may be in the form of a multi-way valve, for instance a ball valve, or any other switchable component.

The invention claimed is:

1. A spraycoating powder feed apparatus, comprising:

a control unit;

a powder pump having a first powder hookup and a second powder hookup, and a reversible feed direction, the powder pump configured to pneumatically move powder from the first powder hookup to the second powder hookup, or to pneumatically move powder from the second powder hookup to the first powder hookup;

a conduit switch comprising at least three conduit connections, the conduit switch configured to alternately link a first conduit connection to either a second conduit connection or to a third conduit connection, wherein the first conduit connection of the conduit switch is connected to the second powder hookup of the powder pump;

a powder feed tube connected to the first powder hookup of the powder pump; and a fluidizing unit fitted at a lower end of the powder feed tube, the fluidizing unit having at least one fluidizing air dispensing element porous to compressed air but impermeable to powder wherein the powder pump and the conduit switch are switched by the control unit in a mutually dependent manner between a forward powder conveyance in which the first conduit connection of the conduit switch is exclusively linked to the second conduit connection but not to the third conduit connection, and a reverse powder conveyance in which the first conduit connection of the conduit switch is exclusively linked to the third conduit connection but not to the second conduit connection.

2. The powder feed apparatus as claimed in claim 1, wherein between the first and the second powder hookups, the powder pump comprises at least one powder chamber fitted with two powder apertures each having one valve, and each connected to one of the first powder hookup and the second powder hookup; and said control unit, during said forward powder conveyance or during said reverse powder conveyance, is arranged for alternately applying vacuum or compressed air to said powder chamber for aspirating a dose of coating powder by vacuum through one of the two powder apertures into the powder chamber and thereupon expelling the dose of coating powder by compressed air out of the powder chamber and through the other powder aperture.

3. Powder feed apparatus as claimed in claim 2, wherein the valves are signal-driven valves.

4. Powder feed apparatus as claimed in claim 1, wherein the powder pump is affixed to the upper end of the powder feed tube and jointly with the feed tube constitutes one unit.

5. Powder feed apparatus as claimed in claim 1, wherein the control unit is configured to reverse the powder pump and to reverse the conduit switch together.

6. Powder feed apparatus as claimed in claim 5, wherein the switch positions of the powder pump and of the conduit switch are mutually dependent in a manner that in one direction of conveyance of the powder pump, the first conduit connection of the conduit switch is linked to the second conduit connection but not to the third conduit connection, whereas in the mode of the opposite powder pump conveyance direction, the first conduit connection of the conduit switch is linked to the third conduit connection but not to the second conduit connection.

7. Powder feed apparatus as claimed in claim 1, wherein the control unit is configured to automatically drive the powder pump and the conduit switch as a function of at least one control signal.

8. A spraycoating powder feed apparatus, comprising:

a powder pump having a first powder hookup and a second powder hookup, and a reversible feed direction, the powder pump configured to pneumatically move powder from the first powder hookup to the second powder hookup, or to pneumatically move powder from the second powder hookup to the first powder hookup;

a conduit switch comprising first through third conduit connections, the conduit switch configured to alternately link the first conduit connection to either the second conduit connection or to the third conduit connection, wherein the first conduit connection of the conduit switch is connected to the second powder hookup of the powder pump;

at least one powder tank;

a powder feed tube connected between at least one said powder tank and the first powder hookup of the powder pump;

a powder delivery conduit connected to the second conduit connection of the conduit switch for receiving fresh powder from at least one said powder tank;

a powder recovery conduit connected to the third conduit connection of the conduit switch for returning unused powder to at least one said powder tank; and a control unit connected to the powder pump and the conduit switch for switching the powder pump and the conduit switch in a mutually dependent manner between a forward powder conveyance in which the first conduit connection of the conduit switch is exclusively linked to the second conduit connection but not to the third conduit connection, and the powder pump is configured to pneumatically move fresh powder from at least one said powder tank to the first powder hookup then to the second powder hookup, then to the powder delivery conduit via the conduit switch, and a reverse powder conveyance in which the first conduit connection of the conduit switch is exclusively linked to the third conduit connection but not to the second conduit connection, and the powder pump is reversed to pneumatically move unused powder from the powder recovery conduit via the conduit switch to the second powder hookup, then to the first powder hookup, then to at least one said powder tank.

9. The powder feed apparatus as claimed in claim 8, wherein between the first and the second powder hookups, the powder pump comprises a powder chamber fitted with first and second powder apertures which are connected to the first powder hookup and the second powder hookup, respectively, and have first and second valves, respectively;

said control unit is configured for, during said forward powder conveyance, alternately applying vacuum or compressed air to said powder chamber for aspirating a dose of powder by vacuum through the first powder aperture into the powder chamber and thereupon expelling the dose of powder by compressed air out of the powder chamber and through the second powder aperture; and said control unit is further configured for, during said reverse powder conveyance, alternately applying vacuum or compressed air to said powder chamber for aspirating a dose of powder by vacuum through the second powder aperture into the powder chamber and thereupon expelling the dose of powder by compressed air out of the powder chamber and through the first powder aperture.

10. The powder feed apparatus as claimed in claim 9, wherein between the first and the second powder hookups, the powder pump further comprises another powder chamber fitted with third and fourth powder apertures which are connected to the first powder hookup and the second powder hookup, respectively, and have third and fourth valves, respectively;

said control unit is configured for, during said forward powder conveyance, alternately applying vacuum or compressed air to said another powder chamber for aspirating a dose of powder by vacuum through the third powder aperture into said another powder chamber and thereupon expelling the dose of powder by compressed air out of said another powder chamber and through the fourth powder aperture; and said control unit is further configured for, during said reverse powder conveyance, alternately applying vacuum or compressed air to said another powder chamber for aspirating a dose of powder by vacuum through the fourth powder aperture into said another powder chamber and thereupon expelling the dose of powder by compressed air out of said another powder chamber and through the third powder aperture.

11. The powder feed apparatus as claimed in claim 10, wherein said control unit is configured for, during each of said forward powder conveyance and said reverse powder conveyance, alternately applying vacuum to one of said powder chambers while applying compressed air to the other one of said powder chambers.

12. The powder feed apparatus as claimed in claim 9, wherein said valves are automatic valves configured to automatically open or close as a function of an excess pressure or vacuum at the respective apertures, without being directly driven by a signal from the control unit.

13. The powder feed apparatus as claimed in claim 9, wherein said valves are signal-driven valves connected to the control unit to open or close in response to a signal from the control unit.

14. The powder feed apparatus as claimed in claim 9, wherein said first valve is connected to a first end of the powder chamber and the second valve is connected to a second end of the powder chamber opposite to the first end, when the first conduit connection of the conduit switch is linked to the second conduit connection but not to the third conduit connection, the first valve is open for the fresh powder from said at least one powder tank coming into the powder chamber while the second valve is closed so as to store the fresh powder in the powder chamber; and the second valve is open for the fresh stored in the powder chamber being moved out while the first valve is closed.

15. The powder feed apparatus as claimed in claim 14, wherein when the first conduit connection of the conduit switch is linked to the third conduit connection but not to the second conduit connection, the second valve is open for the unused powder from the powder recovery conduit while the first valve is closed so as to store the unused powder in the powder chamber; and the first valve is open for the unused powder stored in the powder chamber being moved out while the second valve is closed.

16. The powder feed apparatus as claimed in claim 8, wherein the powder pump is affixed to an upper end of the powder feed tube and jointly with the powder feed tube constitutes one unit.

17. The powder feed apparatus as claimed in claim 16, further comprising:

a fluidizing unit fitted at a lower end of the powder feed tube and dipping into at least one said powder tank;

the fluidizing unit having at least one fluidizing air dispensing element porous to compressed air but impermeable to powder.

18. The powder feed apparatus as claimed in claim 8, further comprising:

a fluidizing unit fitted at a lower end of the powder feed tube and dipping into at least one said powder tank;

the fluidizing unit having at least one fluidizing air dispensing element porous to compressed air but impermeable to powder.

19. The powder feed apparatus as claimed in claim 8, wherein the control unit is configured to automatically drive the powder pump and the conduit switch as a function of at least one control signal.

20. The powder feed apparatus as claimed in claim 8, wherein said at least one powder tank comprises a fresh powder tank and a recovered powder tank; and said powder feed tube is arranged to connect to the fresh powder tank during said forward powder conveyance, and to the recovered powder tank during said reversed powder conveyance.

21. The powder feed apparatus as claimed in claim 20, further comprising:

a powder sprayer connected to the powder delivery conduit and the powder recovery conduit;

wherein the control unit is configured to switch the powder pump and the conduit switch into the forward powder conveyance for supplying fresh powder from the fresh powder tank to the powder sprayer for spraying powder on an object, and to switch the powder pump and the conduit switch into the reverse powder conveyance for returning powder unused by the powder sprayer back into the recovered powder tank.

* * * * *